US012748650B1

(12) United States Patent
BeSerra et al.

(10) Patent No.: US 12,748,650 B1
(45) Date of Patent: Sep. 29, 2026

(54) SERVER DIAGNOSTIC INFORMATION PERSISTENT DISPLAY

(71) Applicant: Amazon Technologies, Inc., Seattle, WA (US)

(72) Inventors: Christopher James BeSerra, Federal Way, WA (US); Darin Lee Frink, Lake Tapps, WA (US); Kyle Roger Jezler, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/977,714

(22) Filed: Dec. 11, 2024

(51) Int. Cl.
*G06F 11/07* (2006.01)
*G06F 11/32* (2006.01)

(52) U.S. Cl.
CPC ...... *G06F 11/0781* (2013.01); *G06F 11/0709* (2013.01); *G06F 11/321* (2013.01); *G06F 11/327* (2013.01); *G06F 11/0769* (2013.01)

(58) Field of Classification Search
CPC ............. G06F 11/0709; G06F 11/0769; G06F 11/0781; G06F 11/32–328
See application file for complete search history.

(56) References Cited

U.S. PATENT DOCUMENTS

| | | | | |
|---|---|---|---|---|
| 7,321,312 | B1 | 1/2008 | Garnett | |
| 9,779,006 | B2 * | 10/2017 | Davis | G06F 11/327 |
| 10,295,561 | B2 | 5/2019 | Critchley et al. | |
| 11,188,642 | B2 * | 11/2021 | Singla | G06F 21/552 |
| 2016/0203040 | A1 * | 7/2016 | Calhoun | G06F 11/006 714/57 |
| 2017/0123886 | A1 * | 5/2017 | Vaideeswaran | G06F 11/0727 |
| 2022/0345378 | A1 * | 10/2022 | Guyan | G09G 3/3453 |

* cited by examiner

*Primary Examiner* — Joseph R Kudirka
(74) *Attorney, Agent, or Firm* — BakerHostetler

(57) ABSTRACT

Server diagnostic data associated with a server may be received. Rendering information may be generated that causes server diagnostic information to be displayed on a display. The server diagnostic information may be representative of the server diagnostic data. The server diagnostic information may be displayed by the display based on the rendering information. The display may be a persistent display that may be configured to initiate the displaying of the server diagnostic information while the display is powered and to persistently display the server diagnostic information while unpowered after experiencing a power loss during the displaying of the first server diagnostic information. Additionally, the display may be powered independently from the server via a connection to a server rack.

14 Claims, 9 Drawing Sheets

SERVER DIAGNOSTIC INFORMATION PERSISTENT DISPLAY

BACKGROUND

Servers may often be operated together in large groups within locations referred to as data centers. In some examples, servers may receive power through a server rack to which the servers may be connected, such as via a direct current (DC) bus bar infrastructure. In these examples, a server may lose power when the server is disconnected from the rack. This may occur, for example, when a technician removes a server from the rack for inspection, repair or servicing of the server. Server diagnostic information is important data that may provide indications of server-related components that are in a failed or degraded state. However, options for presentation of diagnostic information may be limited when a server loses power. This may be problematic because the diagnostic information may be beneficial to the process of diagnosing and solving operational problems associated with the server.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
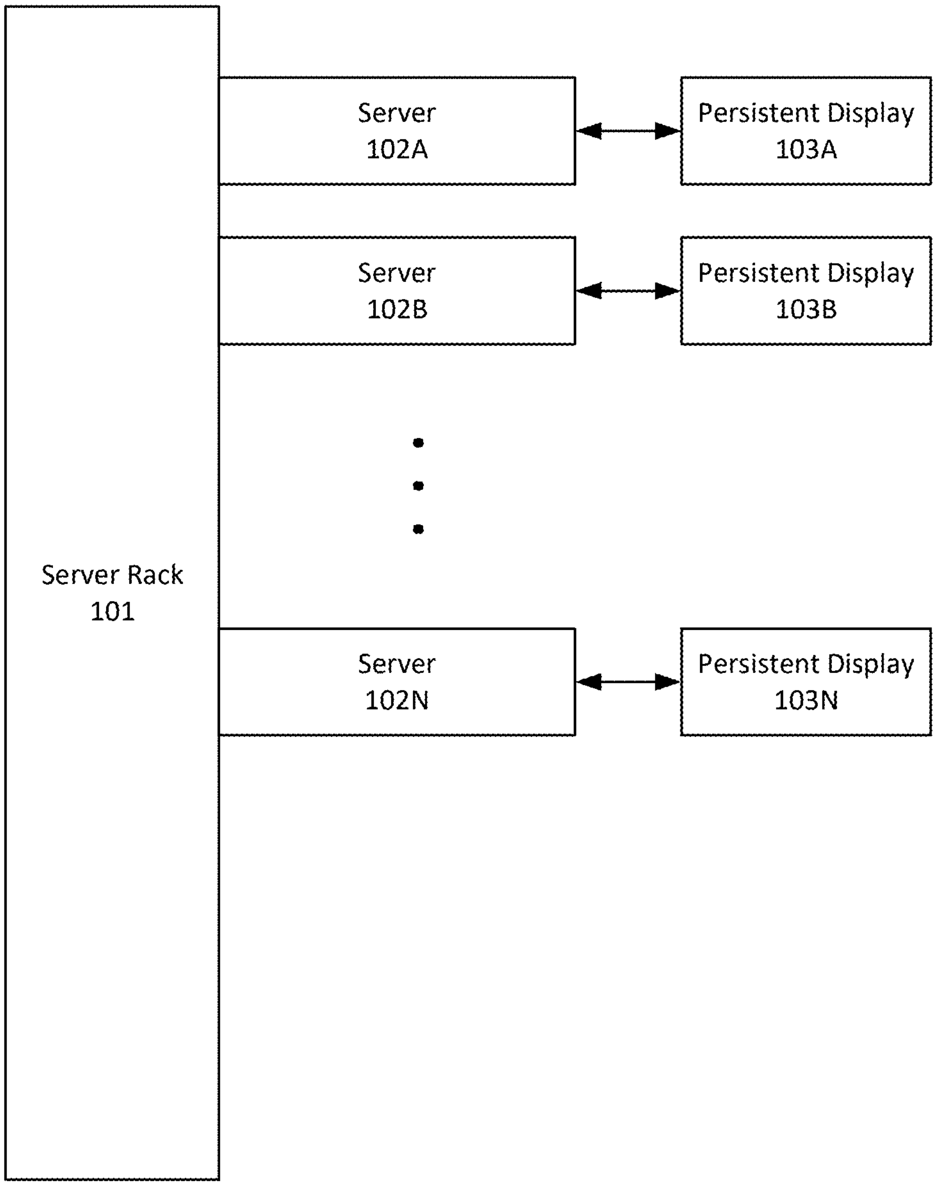
FIG. 1 is a diagram illustrating an example server-level persistent display architecture that may be used in accordance with the present description.

Techniques for display of server diagnostic information are described herein. Specifically, the techniques described herein may allow server diagnostic information associated with a server to be displayed persistently after a server has been disconnected from power. In some examples, server diagnostic information may be displayed on a persistent display that is attached and/or connected to the server. The term persistent display, as used herein, refers to an electronic display that may be updated to display information when the display is powered and that continues to display the information while unpowered after losing power. Persistent displays may include, for example, electronic paper (e-paper) displays.

The persistent display may display server diagnostic information using a variety of visual features, for example including text and scannable assets (e.g., bar codes, quick-response (QR) codes, etc.) and other graphics. In one specific example, the persistent display may display a graphic, such as a small circular graphic, that changes color (e.g., from red to blue) to indicate the status of a corresponding component, such as with blue indicating a connected state for the component and red indicating a disconnected state. In another specific example, the persistent display may display text that represents an error code associated with a given component. In yet another specific example, the persistent display may display a scannable asset that represents encoded information, such as a log of events occurring prior to a crash or other failure. In some cases, the use of scannable assets may be particularly advantageous in scenarios in which the persistent display may not be large enough to display all of the relevant diagnostic information at a single time. In this scenario, information may be encoded into a scannable asset that may occupy less space on the display than would be required to display the information in a non-encoded format.

In some examples, the persistent display may receive power via a corresponding server to which the persistent display is attached or connected. Thus, when the server is connected to a power source (e.g., the server rack), both the server and the persistent display may be in a powered state. By contrast, when the server is disconnected from the power source, both the server and the persistent display may be in an unpowered state. While it is in a powered state, the persistent display may be periodically updated to display updated server diagnostic information. When the persistent display loses power, the persistent display may continue to display the server diagnostic information that was displayed immediately prior to the power loss. This may provide a number of advantages. For example, this may allow diagnostic information for a server to be displayed during the time that a server is disconnected from a power source, such as during inspection, repair or servicing of the server. Additionally, this may allow diagnostic information for a server to be preserved in scenarios when the information may not be reproducible. For example, in some cases, when a server is disconnected from, and then reconnected to, a power source, something may change that may prevent a previously occurring error from being reproduced. Thus, even though the server may regain power, the server may not be capable of reproducing diagnostic information associated with the previous error. However, a persistent display may allow this information to be preserved and displayed on the persistent display during the time that the server is unpowered.

In some examples, due to the limited screen size of the display, prioritization logic may be employed to select which diagnostic information is, and is not, displayed on the display at any given time. For example, in some cases, each portion of diagnostic data may be assigned a given priority, and these priorities may be compared with one another. In one specific example, a priority of newly received diagnostic data may be compared to a priority of previously received diagnostic data associated with information that is currently being displayed by the persistent display. If the newly received diagnostic data has a higher priority than the previously received diagnostic data, then a determination may be made to replace the currently displayed information with the new information corresponding to the newly received diagnostic data. By contrast, in some examples, if the newly received diagnostic data has a lower priority than the previously received diagnostic data, then a determination may be made to not to replace the currently displayed information, or to delay its replacement. Also, in some examples, when multiple different portions of diagnostic data are received together, it may be necessary to prioritize between this data, such as by selecting portions of data having the highest priority for display. In one specific example, there may be at least three priority levels, including routine update, non-fatal error, and fatal error. For example, fatal error may have the highest priority, non-fatal error may have the second-highest priority, and routine update may have the third-highest priority.

In some examples, a persistent display may be attached to a server, such as by being hard mounted to the front of the server. In some other examples, the persistent display may be retractable, such as by being slid into the body of the server. For example, the front of the server may include an opening, and the persistent display may be slid out from the opening for viewing and then slid back into the opening for storage. This design may be advantageous, such as by preserving space on the front of the server for other components. Additionally, in some examples, the persistent display may be attachable to, and detachable from, the server. For example, the persistent display may be detached from the server to allow for repair or serving of the persistent display. Furthermore, when a server is replaced, the persistent display may be reused by detaching the persistent display from the replaced server and attaching the persistent display to the replacement server.

In some examples, a display may be powered independently from a given server. This means that the display has a connection to a power source, and the display's connection to the power source is not dependent on the server such that the display may continue to receive power during times when the server is unpowered. For example, in some cases, a display may be connected to a server rack and may receive power from the server rack. Also, in some examples, a single display may be used to display diagnostic information for multiple different servers. For example, a single display may be used to display diagnostic information for all servers that are connected to a server rack. In some examples, when a given server is disconnected from the server rack and loses power, the display may continue to display diagnostic information for the disconnected server as well as other servers that may remain connected to the server rack. In some examples, such as for rack-level displays that are connected to the server rack, there is no requirement that a persistent display must be used. Thus, in some examples, the display may be a persistent display or may be a non-persistent display. It is noted, however, that, even for rack-level displays, the use of a persistent display may still provide advantages, such as by allowing server diagnostic information to be persistently displayed during times when the server rack is not powered and/or during times when the display is removed from the rack (e.g., during a power failure, during shipping/transportation, etc.).

FIG. 1 is a diagram illustrating an example server-level persistent display architecture that may be used in accordance with the present description. As shown in FIG. 1, servers 102A-N are connected to server rack 101. The servers 102A-N may receive power via the server rack 101, such as via a direct current (DC) bus bar infrastructure. A server 102A-N may lose power when the server 102A-N is disconnected from the server rack 101. This may occur, for example, when a technician removes a server 102A-N from the server rack 101 for inspection, repair or servicing of the server 102A-N. In the example of FIG. 1, each of servers 102A-N has a corresponding persistent display 103A-N. The term persistent display, as used herein, refers to an electronic display that may be updated to display information when the display is powered and that continues to display the information while unpowered after losing power. In some examples, persistent displays 103A-N may include electronic paper (e-paper) displays.

Also, in this example, each of persistent displays 103A-N may receive power via a respective one of servers 102A-N. For example, server 102A may receive power via server rack 101, and persistent display 103A may receive power via server 102A. Thus, when the server 102A is connected to a power source (e.g., the server rack 101), both the server 102A and the persistent display 103A may be in a powered state. By contrast, when the server 102A is not connected to the power source, both the server 102A and the persistent display 103A may be in an unpowered state. While it is in a powered state, the persistent display 103A may be periodically updated to display updated server diagnostic information. When the persistent display 103A loses power, the persistent display 103A may continue to display the server diagnostic information that was displayed immediately prior to the power loss. This may provide a number of advantages. For example, this may allow diagnostic information for server 102A to be displayed during the time that a server 102A is disconnected from a power source, such as during inspection, repair or servicing of the server 102A. Additionally, this may allow diagnostic information for the server 102A to be preserved in scenarios when the information may not be reproducible. For example, in some cases, when the server 102A is disconnected from, and then reconnected to, a power source, something may change that may prevent a previously occurring error from being reproduced. Thus, even though the server 102A may regain power, the server 102A may not be capable of reproducing diagnostic information associated with the previous error. However, the persistent display 103A may allow this information to be preserved and displayed on the persistent display 103A during the time that the server 102A is unpowered.

In some examples, each of persistent displays 103A-N may display server diagnostic information corresponding to a respective one of servers 102A-N. For example, persistent display 103A may display server diagnostic information corresponding to server 102A, persistent display 103B may display server diagnostic information corresponding to server 102B, and so forth. The persistent displays 103A-N may display server diagnostic information using a variety of visual features, for example including text, scannable assets (e.g., bar codes, quick-response (QR) codes, etc.) and other graphics, and other features. In one specific example, the persistent displays 103A-N may display a graphic, such as a small circular graphic, that changes color (e.g., from red to blue) to indicate the status of a corresponding component, such as with blue indicating a connected state for the component and red indicating a disconnected state. In another specific example, the persistent displays 103A-N may display text that represents an error code associated with a given component. In yet another specific example, the persistent displays 103A-N may display a scannable asset that represents encoded information, such as a log of events occurring prior to a crash or other failure. In some cases, the use of scannable assets may be particularly advantageous in scenarios in which the persistent displays 103A-N may not be large enough to display all of the relevant diagnostic information at a single time. In this scenario, information may be encoded into a scannable asset that may occupy less space than would be required to display the information in a non-encoded format.

Figure 2:
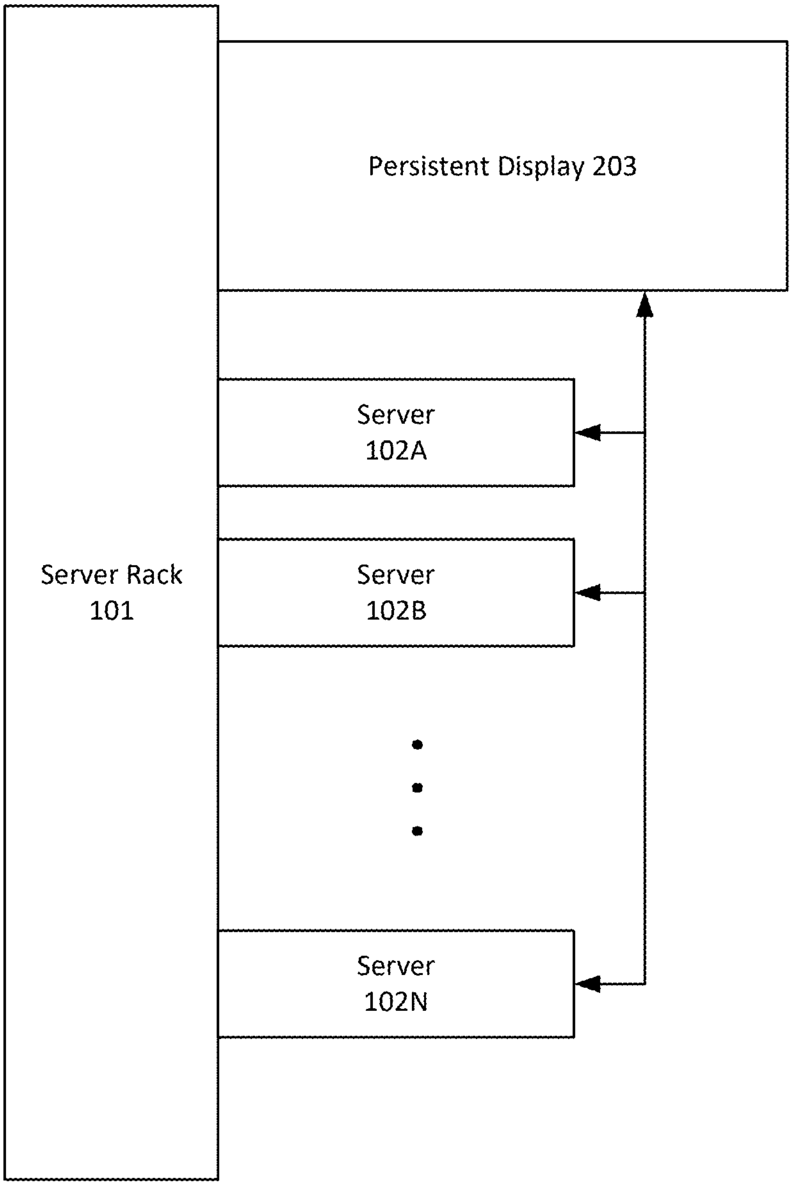
FIG. 2 is a diagram illustrating an example rack-level persistent display architecture that may be used in accordance with the present description.

FIG. 2 is a diagram illustrating an example rack-level persistent display architecture that may be used in accordance with the present description. A rack-level display is a display that provides diagnostic information corresponding to a plurality of components associated with a server rack, such as a group of servers attached to a given server rack. As shown in FIG. 2, servers 102A-N are connected to server rack 101. The servers 102A-N may receive power via the server rack 101, such as via a direct current (DC) bus bar infrastructure. Additionally, in this example, persistent display 203 is connected (e.g., directly connected) to the server rack 101. The persistent display 203 may receive power via the server rack 101, such as via the direct current (DC) bus bar infrastructure. Thus, in this example, the persistent display 203 is powered independently from each of servers 102A-N. This means that the persistent display 203 has a connection to a power source that is not dependent on servers 102A-N such that the persistent display 203 may continue to receive power during times when any, or all, of the servers 102A-N are not connected to a power source (e.g., are disconnected from server rack 101). Persistent display 203 may be used to display diagnostic information corresponding to servers 102A-N. In some examples, when a given server is disconnected from the server rack 101 and loses power, the persistent display 203 may continue to display diagnostic information for the disconnected server as well as other servers that may remain connected to the server rack. In some examples, in addition, or as an alternative, to servers, the persistent display 203 may display diagnostic information for other components associated with a server rack. These other components may include, for example, one or more power supplies (e.g., included in a power supply shelf), one or more batteries (e.g., included in a battery shelf), data switches, and other components associated with a server rack.

Figure 3:
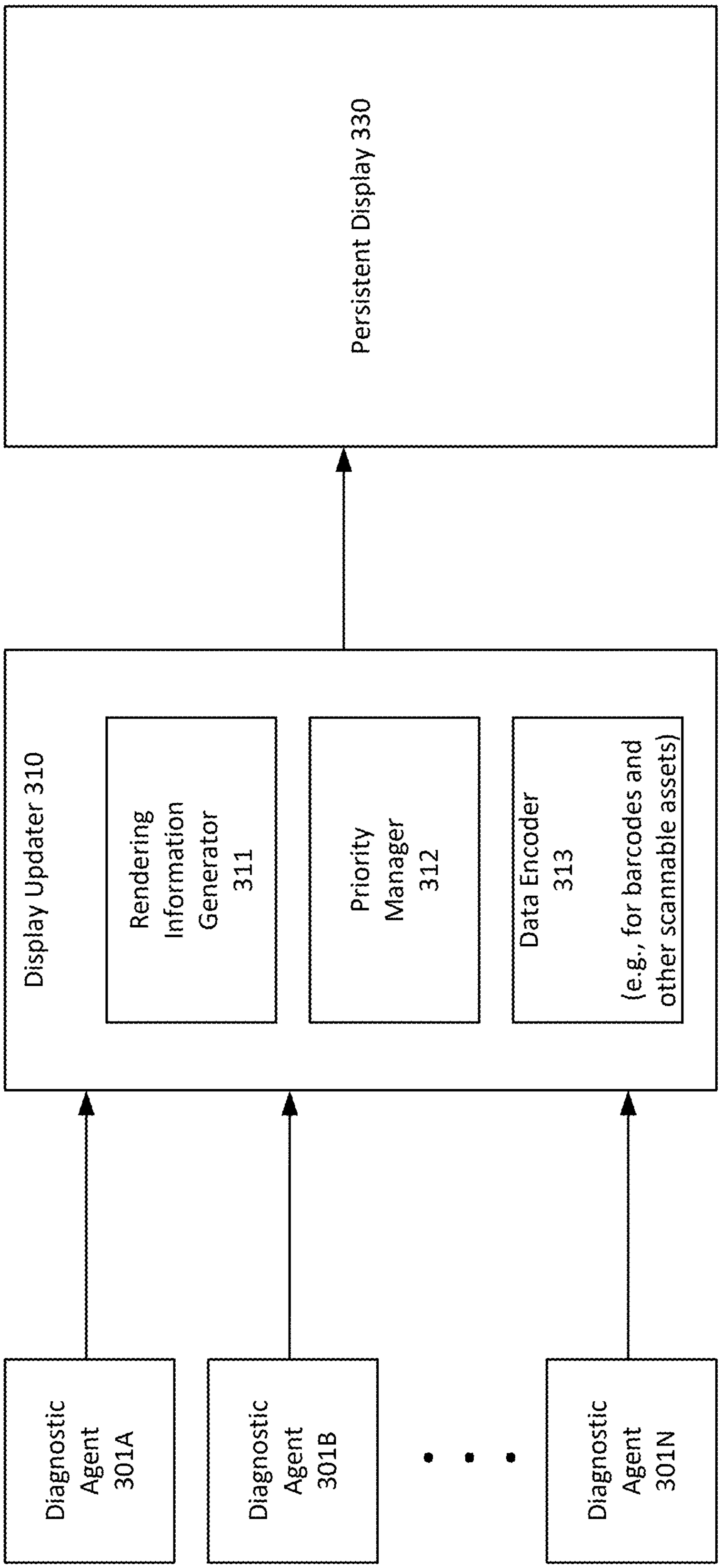
FIG. 3 is a diagram illustrating an example server diagnostic information updating system that may be used in accordance with the present description.

FIG. 3 is a diagram illustrating an example server diagnostic information updating system that may be used in accordance with the present description. In the example of FIG. 3, diagnostic agents 301A-N may report server diagnostic data to display updater 310. In some examples, only a single diagnostic agent (e.g., diagnostic agent 301A) may be employed. In other examples, any number of diagnostic agents 103A-N may be employed. Depending upon the selected configuration, diagnostic agents 103A-N may all be included in a single server, may be distributed across multiple servers, or may be otherwise configured. Diagnostic agents 301A-N may include components such as server baseboard management controllers, smart network interface controllers, and the like. In some examples, one or more of diagnostic agents 301A-N may perform actions such as reading temperatures associated with different server components, regulating server temperature (e.g., by controlling server cooling fan operation), reading voltages associated with different server components, turning off the server in scenarios when operation is considered unsafe, monitoring timeouts associated with different operations, storing and maintaining event logs, and other operations. Also, in some examples, one or more of diagnostic agents 301A-N may perform actions such as allocating, managing, and monitoring processor and memory resources associated with a server, including virtual computing resources such as virtual computing instances.

The display updater 310 receives server diagnostic data provided by diagnostic agents 301A-N. The display updater 310 manages updating of the persistent display 330, which may display server diagnostic information corresponding to one or more servers. The term server diagnostic data, as used herein, refers to data associated with diagnosis of any operational problem, error or failure corresponding to a server, including data relating to operational status or events associated with server-related components. Sever diagnostic data may include, for example, indications of whether a given component is powered-on or powered-off, indications of whether a given connection is active or inactive, information regarding errors (e.g., error codes), logs and event records, and many other types of data. Server diagnostic information may include any information (e.g., graphics, text, scannable assets, etc.) that is representative of server diagnostic data. In some examples, server diagnostic information may include the server diagnostic data itself. Also, in some examples, the server diagnostic information may include information related to the server diagnostic data, such as a bar code that may be scannable to display an event log included in the server diagnostic data.

In this example, the display updater 310 includes rendering information generator 311, priority manager 312, and data encoder 313. The rendering information generator 311 generates rendering information based on the server diagnostic data provided by diagnostic agents 103A-N. Rendering information is information that causes the persistent display to display server diagnostic information, for example in the form of text and scannable assets (e.g., bar codes, quick-response (QR) codes, etc.) and other graphics. For example, the rendering information may include a bitmap corresponding to a displayed image that is written to a display screen of the persistent display 330. In one specific example, server diagnostic data reported by diagnostic agent 301A may indicate that a given component of the server has become disconnected. Based on this diagnostic data, the rendering information generator 311 may determine that a graphical indicator corresponding to the component should change color from blue to red to indicate this disconnection. The rendering information generator 311 may then generate rendering information that includes a bitmap corresponding to a new image in which the color of this graphical indicator is changed from blue to red. This rendering information may be sent to the persistent display 330, which may cause the persistent display 330 to present, on its display screen, a new updated image in which the color of the indicator is changed from blue to red.

Priority manager 312 may prioritize different portions of server diagnostic information for display on the persistent display 330. In some examples, due to the limited screen size of the persistent display 330, prioritization logic may be employed to select which diagnostic information is, and is not, displayed by the persistent display 330 at any given time. For example, in some cases, each portion of diagnostic data reported by diagnostic agents 301A-N may be assigned a given priority. The priority manager 312 may compare these priorities with one another. In one specific example, a priority of newly received diagnostic data may be compared to a priority of previously received diagnostic data associated with information that is currently being displayed by the persistent display 330. If the newly received diagnostic data has a higher priority than the previously received diagnostic data, then priority manager 312 may choose to replace the currently displayed information with the new information corresponding to the newly received diagnostic data. By contrast, in some examples, if the newly received diagnostic data has a lower priority than the previously received diagnostic data, then a determination may be made to not to replace the currently displayed information, or to delay its replacement. Also, in some examples, when multiple different portions of diagnostic data are received together, it may be necessary to prioritize between this data, such as by selecting portions of data having the highest priority for display. In one specific example, there may be at least three priority levels, including routine update, non-fatal error, and fatal error. For example, fatal error may have the highest priority, non-fatal error may have the second-highest priority, and routine update may have the third-highest priority.

Data encoder 313 may encode diagnostic data into scannable assets, such as bar codes, QR codes, and the like. As described above, a scannable asset may represent encoded server diagnostic data, such as a log of events occurring prior to a crash or other failure. In some cases, the use of scannable assets may be particularly advantageous in scenarios in which the persistent display 330 may not be large enough to display all of the relevant diagnostic information at a single time. In this scenario, information may be encoded into a scannable asset that may occupy less space on the persistent display 330 than would be required to display the information in a non-encoded format. In some examples, priority manager 312 may send instructions to data encoder 313 to encode a given portion of diagnostic data into a scannable asset. For example, if priority manager 312 determines that a given portion of diagnostic data cannot fit on the screen, or is lower in priority than other information that is being displayed on the screen, then the priority manager 312 may instruct the data encoder to encode this diagnostic data into a scannable asset, such that the data may still be accessible without occupying a substantial amount of space of the display screen of the persistent display 330.

Figure 4:
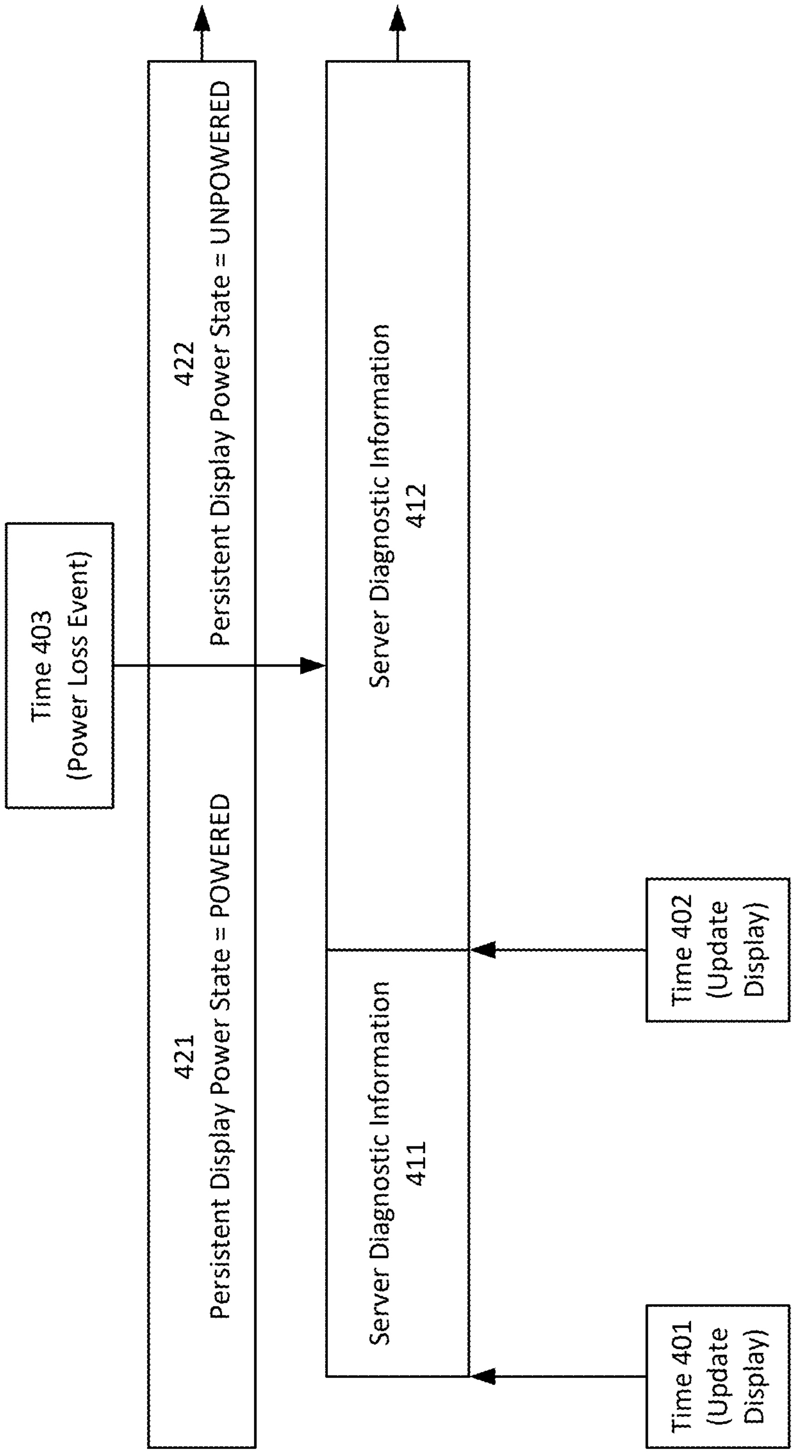
FIG. 4 is a diagram illustrating example diagnostic information display updates of a persistent display that may be used in accordance with the present description.

FIG. 4 is a diagram illustrating example diagnostic information display updates of a persistent display that may be used in accordance with the present description. In the example of FIG. 4, box 421 indicates a time period during which a persistent display (e.g., persistent display 103A of FIG. 1) is in a powered state. As shown, the text of box 421 states that the Persistent Display Power State=POWERED. At time 401, the persistent display may be updated to display server diagnostic information 411. The updating of the persistent display at time 401 occurs while the persistent display is in the powered state. Sever diagnostic information 411 may include, for example text, scannable assets and other graphics, and/or other features. Server diagnostic information 411 may include, for example, indications of whether a given component is powered-on or powered, indications of whether a given connection is active or inactive, information regarding errors (e.g., error codes), logs and event records, and many other types of information. At time 402, while the persistent display is still in the powered state, the persistent display is updated again to display server diagnostic information 412. Thus, at time 402, the persistent display ceases to display server diagnostic information 411 and is updated to display server diagnostic information 412.

At time 403, the persistent display experiences a power loss event that causes the persistent display to lose power. Thus, at time 403, the persistent display changes from the powered state (represented by box 421) to the unpowered state (represented by box 422). As shown, the text of box 422 states that the Persistent Display Power State=UNPOWERED. In some examples, the power loss event that occurs at time 403 may include a removal of a server (e.g., server 102A of FIG. 1) from the server rack 101. As described above, in some examples, persistent display 103A may receive power from server 102A, which, in turn, may receive power from the server rack 101. Thus, removing server 102A from the server rack may cause both server 102A and persistent display 103A to lose power.

In this example, because the server diagnostic information 412 is displayed on a persistent display, the persistent display may continue to display the server diagnostic information 412 after the persistent display loses power. The persistent display may continue to display the server diagnostic information 412 for the entire time that it remains in the unpowered state, as indicated in FIG. 4 by the arrows extending from the right side of box 422 and server diagnostic information 412. This may provide a number of advantages. For example, this may allow server diagnostic information 412 to be displayed during the time that a server is disconnected from a power source, such as during inspection, repair or servicing of the server. Additionally, this may allow server diagnostic information 412 to be preserved in scenarios when the information may not be reproducible. For example, in some cases, when a server is disconnected from, and then reconnected to, a power source, something may change that may prevent a previously occurring error from being reproduced. Thus, even though the server may regain power, the server may not be capable of reproducing diagnostic information associated with the previous error. However, a persistent display may allow this information to be preserved and displayed on the persistent display during the time that the server is unpowered.

Figure 5:
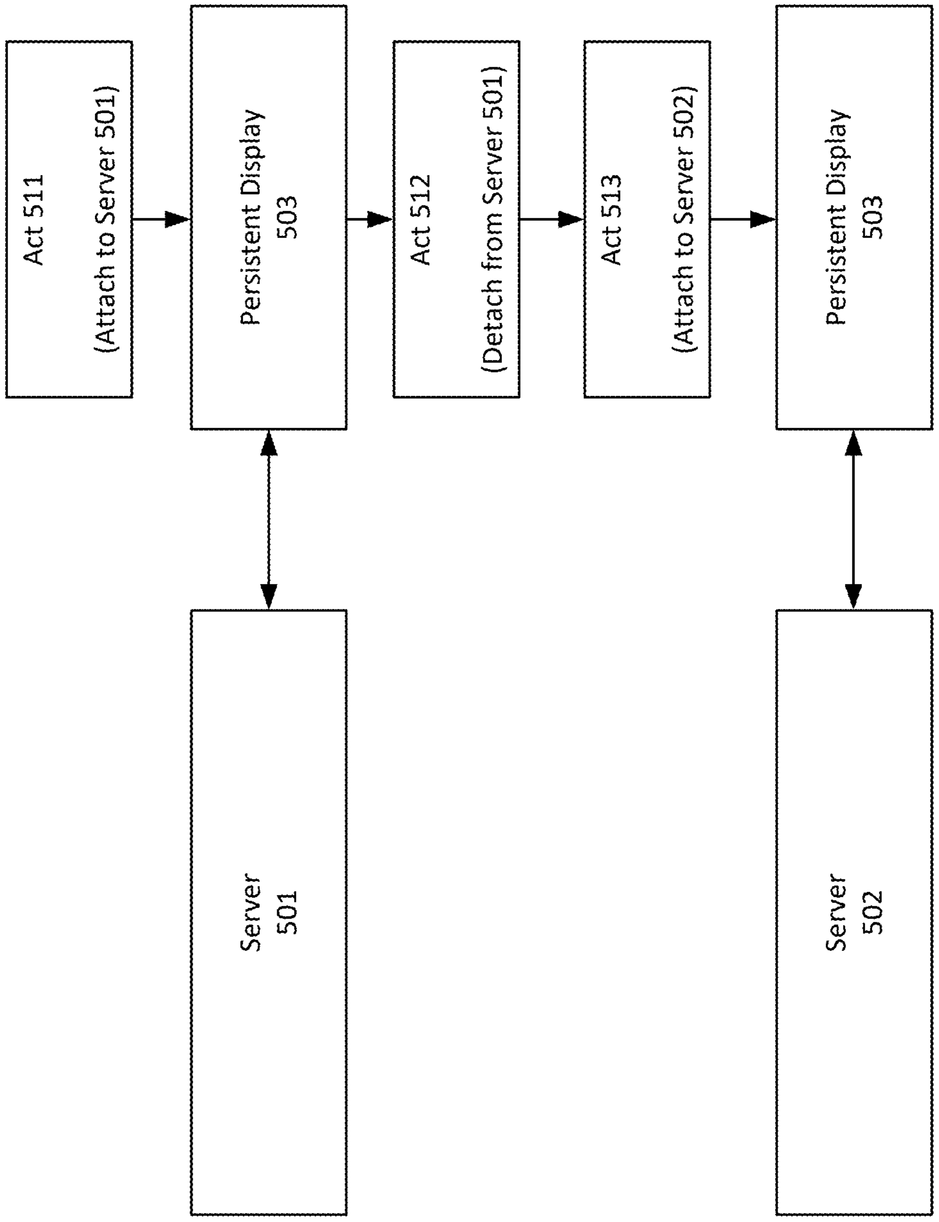
FIG. 5 is a diagram illustrating an example attachable and detachable persistent display and corresponding servers that may be used in accordance with the present description.

In some examples, a persistent display may be attachable to, and detachable from, a given server. For example, the persistent display may be detached from the server to allow for repair or serving of the persistent display. Furthermore, when a server is replaced, the persistent display may be reused by detaching the persistent display from the replaced server and attaching the persistent display to the replacement server. Referring now to FIG. 5, an example is shown in which a persistent display may be attachable to, and detachable from, multiple different servers. As shown in FIG. 5, at 511, the persistent display 503 may be attached to server 501. In one specific example, a chassis of the server 501 may include a bracket to which the persistent display may be affixed. The bracket may hold the persistent display 503 in place while the persistent display is attached to the server 501. Additionally, in one specific example, the server may be equipped with a cable that may be inserted into a port on the persistent display 503, and this cable may allow data to be transmitted between server components (e.g. display updater 301 of FIG. 3) and the persistent display 503.

At act 512, the persistent display 503 may be detached from server 501. For example, in some cases, the persistent display 503 may be detached from server 501 when the server 501 is being replaced, such as when the server 501 ceases to work properly and/or is being replaced with a newer model. In other some examples, the persistent display 503 may be detached from server 501 in order to service or repair the persistent display 503. In one specific example, the persistent display 503 may be detached from the server 501 by removing the persistent display from the above-described bracket on the server 501 and also disconnecting the above-described cable from the persistent display 503.

In the example of FIG. 5, after being detached from server 501 at act 512, the persistent display 503 is subsequently attached to server 502 at act 513. It is noted however, that this is merely an example. In some other examples, the persistent display 503 may optionally be re-attached to server 501 as opposed to being attached to server 502. In some examples, server 502 may be a replacement for server 501. Thus, in this example, because the persistent display 503 may be attachable to, and detachable from, multiple different servers, the persistent display 503 may be reused. Accordingly, when server 501 ceases to operate, the persistent display 503 may be reused by moving the persistent display 503 from server 501 to server 502. It is noted that the attachable and detachable design described with reference to FIG. 5 is merely one example. In some other examples, a persistent display may be hard mounted to the front of the server. Also, in some examples, the persistent display may be retractable, such as by being slid into the body of the server. For example, the front of the server may include an opening, and the persistent display may be slid out from the opening for viewing and then slid back into the opening for storage. This design may be advantageous, such as by preserving space on the front of the server for other components.

Figure 6:
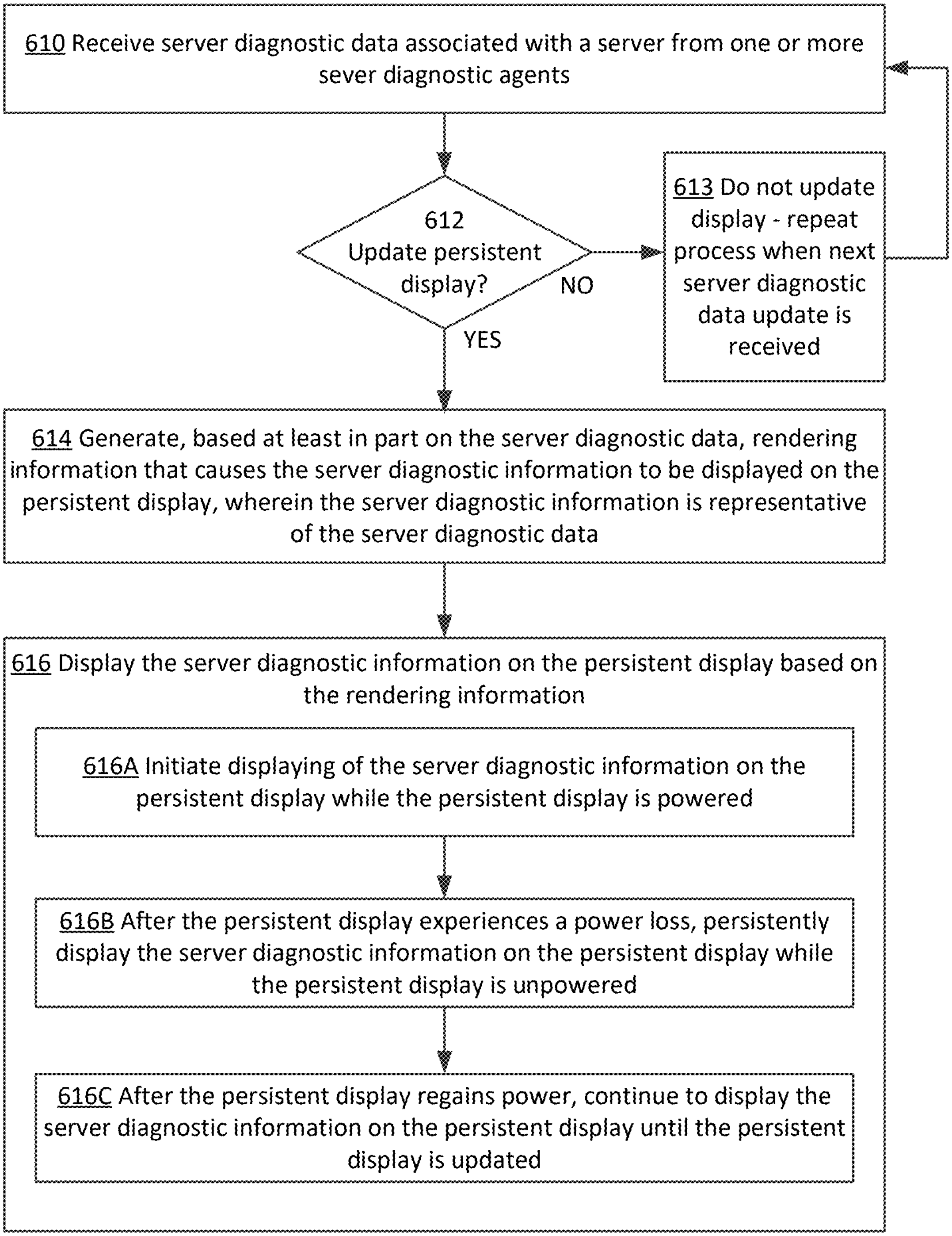
FIG. 6 is a flowchart illustrating a first example server diagnostic information display process that may be used in accordance with the present description.

FIG. 6 is a flowchart illustrating a first example server diagnostic information display process that may be used in accordance with the present description. At operation 610, server diagnostic data is received from one or more diagnostic agents. For example, as discussed above with reference to FIG. 3, display updater 310 may receive server diagnostic data from diagnostic agents 301A-N. The term server diagnostic data, as used herein, refers to data associated with diagnosis of any operational problem, error or failure corresponding to a server, including data relating to operational status or events associated with server-related components. Sever diagnostic data may include, for example, indications of whether a given component is powered-on or powered-off, indications of whether a given connection is active or inactive, information regarding errors (e.g., error codes), logs and event records, and many other types of data.

At operation 612, it is determined whether to update a persistent display based on the first diagnostic data. In some examples, due to the limited screen size of the persistent display 330, prioritization logic may be employed to select which diagnostic information is, and is not, displayed by the persistent display 330 at any given time. For example, in some cases, each portion of diagnostic data reported by diagnostic agents 301A-N may be assigned a given priority. The priority manager 312 may compare these priorities with one another. In one specific example, a priority of newly received diagnostic data may be compared to a priority of previously received diagnostic data associated with information that is currently being displayed by the persistent display 330. If the newly received diagnostic data has a higher priority than the previously received diagnostic data, then priority manager 312 may choose to replace the currently displayed information with the new information corresponding to the newly received diagnostic data. By contrast, in some examples, if the newly received diagnostic data has a lower priority than the previously received diagnostic data, then a determination may be made to not to replace the currently displayed information, or to delay its replacement. Also, in some examples, when multiple different portions of diagnostic data are received together, it may be necessary to prioritize between this data, such as by selecting portions of data having the highest priority for display. In some examples, a diagnostic data prioritization hierarchy may include a plurality of priorities. For example, a highest priority may be assigned to the most important/urgent information, and the highest priority may therefore be granted priority for prompt/immediate display relative to data with other priority levels. Similarly, in some examples, there may also be a second-highest priority, a third-highest priority, and so forth. For example, the second-highest priority may have display priority over all other priority levels (e.g., third-highest priority, etc.) except for the highest priority. In one specific example, there may be at least three priority levels, including routine update, non-fatal error, and fatal error. For example, fatal error may have the highest priority, non-fatal error may have the second-highest priority, and routine update may have the third-highest priority.

Thus, in some examples, first diagnostic data received at operation 610 may have a first priority of a plurality of priorities of a diagnostic data prioritization hierarchy. In some cases, the first priority may be assigned to the first diagnostic data by the one or more diagnostic agents, such as based on the contents of the first diagnostic data. Also, in some examples, it may be determined, based at least in part on the first priority of the first diagnostic data, to perform a diagnostic information update on the persistent display, such as by having first server diagnostic information representing the first server diagnostic data replace other server diagnostic information that is displayed by the persistent display prior to the first server diagnostic information. This may include determining that the first priority of the first server diagnostic data is higher in the diagnostic data prioritization hierarchy than a second priority of other server diagnostic data represented by the other server diagnostic information. This may also include determining to perform the diagnostic information update based at least in part on the first priority being higher in the diagnostic data prioritization hierarchy than the second priority.

If, it operation 612, a determination is made not to update the persistent display, then, at operation 613, the display is not updated and the process of FIG. 6 is repeated when a next server diagnostic data update is received, such as when the one or more diagnostic agents 301A-N report additional updated server diagnostic data to the display updater 310.

If, at operation 612, a determination is made to update the persistent display, then the process proceeds to operation 614. At operation 614, based at least in part on the server diagnostic data, rendering information is generated that causes server diagnostic information to be displayed on the persistent display, wherein the server diagnostic information is representative of the server diagnostic data. As described above with reference to FIG. 3, the rendering information generator 311 generates rendering information based on the server diagnostic data provided by diagnostic agents 103A-N. Rendering information is information that causes the persistent display to display server diagnostic information, for example in the form of text, scannable assets and other graphics, and other features. For example, the rendering information may include a bitmap corresponding to a displayed image that is written to a display screen of the persistent display 330. In one specific example, server diagnostic data reported by diagnostic agent 301A may indicate that a given component of the server has become disconnected. Based on this diagnostic data, the rendering information generator 311 may determine that a graphical indicator corresponding to the component should change color from blue to red to indicate this disconnection. The rendering information generator 311 may then generate rendering information that includes a bitmap corresponding to a new image in which the color of this graphical indicator is changed from blue to red. This rendering information may be sent to the persistent display 330, which may cause the persistent display 330 to present, on its display screen, a new updated image in which the color of the indicator is changed from blue to red.

In some examples, operation 614 may include generating a scannable asset that is included in the first rendering information. In one specific example, the scannable asset may be a bar code. Data encoder 313 may encode diagnostic data into scannable assets, such as bar codes, QR codes, and the like. As described above, a scannable asset may represent encoded server diagnostic data, such as a log of events occurring prior to a crash or other failure. In some cases, the use of scannable assets may be particularly advantageous in scenarios in which the persistent display may not be large enough to display all of the relevant diagnostic information at a single time.

At operation 616, the server diagnostic information is displayed on the persistent display based on the rendering information. As described above, a persistent display is an electronic display that may be updated to display information when the display is powered and that continues to display the information while unpowered after losing power. Persistent displays may include, for example, electronic paper (e-paper) displays. In some examples, the persistent display may be connected to a power source via the server, and the persistent display may lose power when the server is disconnected from the power source. In some examples, the persistent display may be hard mounted to the server or may be attachable to, and detachable from, the server. Also, in some examples, the persistent display may be included in a panel that is extendible from the server for viewing and that is retractable into the server for storage.

The persistent display may display server diagnostic information using a variety of visual features, for example including text, scannable assets (e.g., bar codes, quick-response (QR) codes, etc.) and other graphics, and other features. In one specific example, the persistent display may display a graphic, such as a small circular graphic, that changes color (e.g., from red to blue) to indicate the status of a corresponding component, such as with blue indicating a connected state for the component and red indicating a disconnected state. In another specific example, the persistent display may display text that represents an error code associated with a given component. In yet another specific example, the persistent display may display a scannable asset that represents encoded information, such as a log of events occurring prior to a crash or other failure.

In some examples, operation 616 may include operations 616A-C. At operation 616A, the displaying of the server diagnostic information is initiated on the persistent display while the persistent display is powered. At operation 616B, after the persistent display experiences a power loss, the server diagnostic information is persistently displayed on the persistent display while the persistent display is unpowered. At operation 616C, after the persistent display regains power, the persistent display continues to display the server diagnostic information on the persistent display until the persistent display is updated with new server diagnostic information. Thus, the persistent display is configured to initiate the displaying of the first server diagnostic information while the persistent display is powered and to persistently display the first server diagnostic information while unpowered after experiencing a power loss during the displaying of the first server diagnostic information. As described above, this may provide a number of advantages. For example, this may allow diagnostic information for a server to be displayed during the time that a server is disconnected from a power source, such as during inspection, repair or servicing of the server. Additionally, this may allow diagnostic information for a server to be preserved in scenarios when the information may not be reproducible. For example, in some cases, when a server is disconnected from, and then reconnected to, a power source, something may change that may prevent a previously occurring error from being reproduced. Thus, even though the server may regain power, the server may not be capable of reproducing diagnostic information associated with the previous error. However, a persistent display may allow this information to be preserved and displayed on the persistent display during the time that the server is unpowered.

Figure 7:
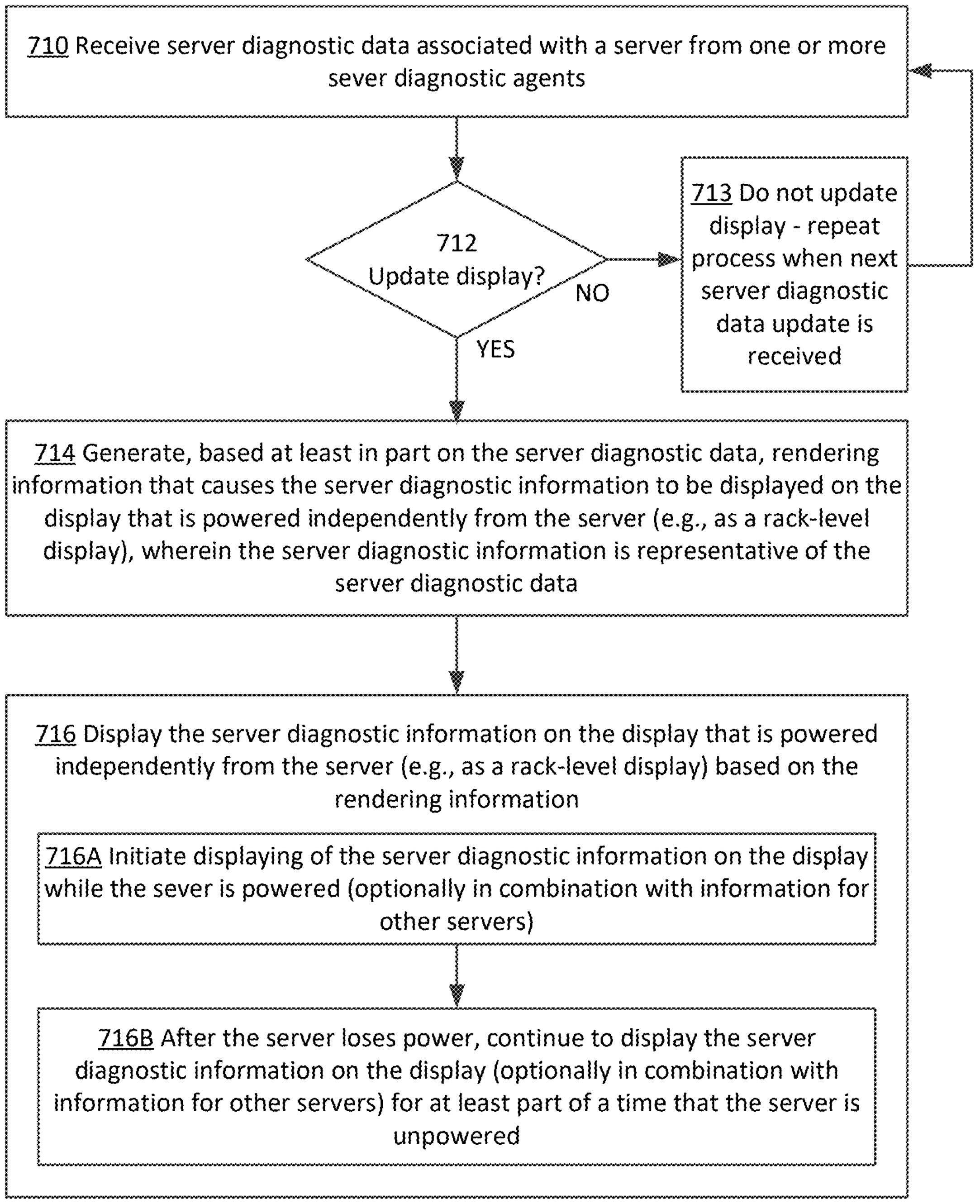
FIG. 7 is a flowchart illustrating a second example server diagnostic information display process that may be used in accordance with the present description.

FIG. 7 is a flowchart illustrating a second example server diagnostic information display process that may be used in accordance with the present description. In the example of FIG. 7, the display is powered independently from the server, such as shown in the rack-level display example of FIG. 2. In the example of FIG. 7, it is not required that the display must be a persistent display. Rather, in this example, because the display is powered independently from the server, the display may continue to display diagnostic information for a disconnected server regardless of whether, or not, the display is a persistent display. Thus, the display referred to in FIG. 7 may be a persistent display or may be a non-persistent display. It is noted, however, that the use of a persistent display may still provide advantages in the example of FIG. 7, such as by allowing server diagnostic information to be persistently displayed during times in which the server rack is not powered and/or during times in which the display is removed from the rack (e.g., during a power failure, during shipping/transportation, etc.). It is noted that operations 710 and 712 of FIG. 7 are identical to operations 610 and 612 of FIG. 6. Thus, the description above for operations 610 and 612 may be considered to also apply to operations 710 and 712, and this description is not repeated here (with the exception that operations 710 and 712 do not necessarily require the use of a persistent display). If, at operation 712, a determination is made not to update the display, then, at operation 713, the display is not updated and the process of FIG. 7 is repeated when a next server diagnostic data update is received, such as when the one or more diagnostic agents 301A-N report additional updated server diagnostic data to the display updater 310.

If, at operation 712, a determination is made to update the display, then the process proceeds to operation 714. At operation 714, based at least in part on the server diagnostic data, rendering information is generated that causes server diagnostic information to be displayed on the display that is powered independently from the server, wherein the server diagnostic information is representative of the server diagnostic data. The display may be powered via a connection to the server rack, such as a connection that is separate from the server's connection to the server rack. In some examples, both the display and the server may be powered via separate respective connections to a same DC bus bar infrastructure associated with the server rack. FIG. 2 shows an example in which a persistent display 203 is powered independently from servers 102A-N. In the example of FIG. 2, persistent display 203 is connected (e.g., directly connected) to the server rack 101. The persistent display 203 may receive power via the server rack 101, such as via the direct current (DC) bus bar infrastructure. Thus, in this example, the persistent display 203 is powered independently from each of servers 102A-N. This means that the persistent display 203 has a connection to a power source that is not dependent on servers 102A-N such that the persistent display 203 may continue to receive power during times when any, or all, of the servers 102A-N are disconnected from a power source (e.g., disconnected from server rack 101). Persistent display 203 may be used to display diagnostic information corresponding to any, or all, of servers 102A-N. Thus, in some examples, in addition to displaying server diagnostic information for a first server (e.g., server 102A) a display may display other server diagnostic information for one or more other servers (e.g., servers 102B-N). The one or more other servers may be on attached to a same server rack as the first server.

As described above with reference to FIG. 3, the rendering information generator 311 generates rendering information based on the server diagnostic data provided by diagnostic agents 103A-N. Rendering information is information that causes the display to display server diagnostic information, for example in the form of text, scannable assets (e.g., bar codes, quick-response (QR) codes, etc.) and other graphics, and other features. For example, the rendering information may include a bitmap corresponding to a displayed image that is written to a display screen of the persistent display 330. In one specific example, server diagnostic data reported by diagnostic agent 301A may indicate that a given component of the server has become disconnected. Based on this diagnostic data, the rendering information generator 311 may determine that a graphical indicator corresponding to the component should change color from blue to red to indicate this disconnection. The rendering information generator 311 may then generate rendering information that includes a bitmap corresponding to a new image in which the color of this graphical indicator is changed from blue to red. This rendering information may be sent to the persistent display 330, which may cause the persistent display 330 to present, on its display screen, a new updated image in which the color of the indicator is changed from blue to red.

In some examples, operation 714 may include generating a scannable asset that is included in the first rendering information. In one specific example, the scannable asset may be a bar code. Data encoder 313 may encode diagnostic data into scannable assets, such as bar codes, QR codes, and the like. As described above, a scannable asset may represent encoded server diagnostic data, such as a log of events occurring prior to a crash or other failure. In some cases, the use of scannable assets may be particularly advantageous in scenarios in which the persistent display may not be large enough to display all of the relevant diagnostic information at a single time.

At operation 716, the server diagnostic information is displayed on the display based on the rendering information. As described above, the display may display server diagnostic information using a variety of visual features, for example including text, graphics, and others. In one specific example, the display may display a graphic, such as a small circular graphic, that changes color (e.g., from red to blue) to indicate the status of a corresponding component, such as with blue indicating a connected state for the component and red indicating a disconnected state. In another specific example, the display may display text that represents an error code associated with a given component. In yet another specific example, the display may display a scannable asset that represents encoded information, such as a log of events occurring prior to a crash or other failure. Thus, as described above, the display may receive rendering information, such as a bitmap, and present, on a display screen, an image generated based on the rendering information. As also described above, the generated image may include, for example, text, scannable assets and other graphics and/or other information representative of the diagnostic data. The display may therefore be configured to display the server diagnostic information based on the rendering information.

In some examples, operation 716 may include operations 716A-B. At operation 716A, the displaying of the server diagnostic information is initiated on the display while the server is powered. At operation 716B, after the server experiences a power loss, the display continues to display the server diagnostic information for at least part of a time that the server is unpowered. For both operations 716A and 716B, the server diagnostic information may be displayed in combination with other server diagnostic information for one or more other servers. As described above, in some examples, when a given server is disconnected from the server rack and loses power, a display may continue to display diagnostic information for the disconnected server as well as other servers that may remain connected to the server rack. For example, when a given server is disconnected from the server rack and loses power, the display may continue to display the same diagnostic information for the given server that was being displayed at the time that the given server was disconnected. By contrast, the server diagnostic information for the remaining connected servers may continue to update. In some examples, display updater 310 of FIG. 3 may receive notifications indicating when a given server is disconnected from, and reconnected to, the server rack. For example, the server rack may include one or more sensors that detect connections and disconnections of servers to, and from, the server rack, and these sensors may report the connections and disconnections to the display updater 310. In some cases, when the display updater 310 determines that a given server has been disconnected, the display updater 310 may cause the display to continue to show server diagnostic information for the given disconnected server until the given server is reconnected or for an otherwise configurable time period, such as sixty minutes after disconnection of the server. In one specific example, the server diagnostic information for the given server may be retained on the display until the given server is reconnected to the server rack or until the configurable time period (e.g., sixty minutes) expiries, whichever event occurs first.

Thus, the display is configured to initiate the displaying of the server diagnostic information while the server is powered and to continue to display the server diagnostic information after the server experiences a power loss for at least part of a time that the server is unpowered. In this example, because the display is powered independently from the server, the display may continue to display server diagnostic information for the server after the server is removed from the server rack. This may provide a number of advantages. For example, this may allow diagnostic information for a server to be displayed during the time that a server is disconnected from a power source, such as during inspection, repair or servicing of the server. Additionally, this may allow diagnostic information for a server to be preserved in scenarios when the information may not be reproducible. For example, in some cases, when a server is disconnected from, and then reconnected to, a power source, something may change that may prevent a previously occurring error from being reproduced. Thus, even though the server may regain power, the server may not be capable of reproducing diagnostic information associated with the previous error. However, a display that is powered independently from the server may allow this information to be preserved and displayed on the independently powered display during the time that the server is unpowered.

Figure 8:
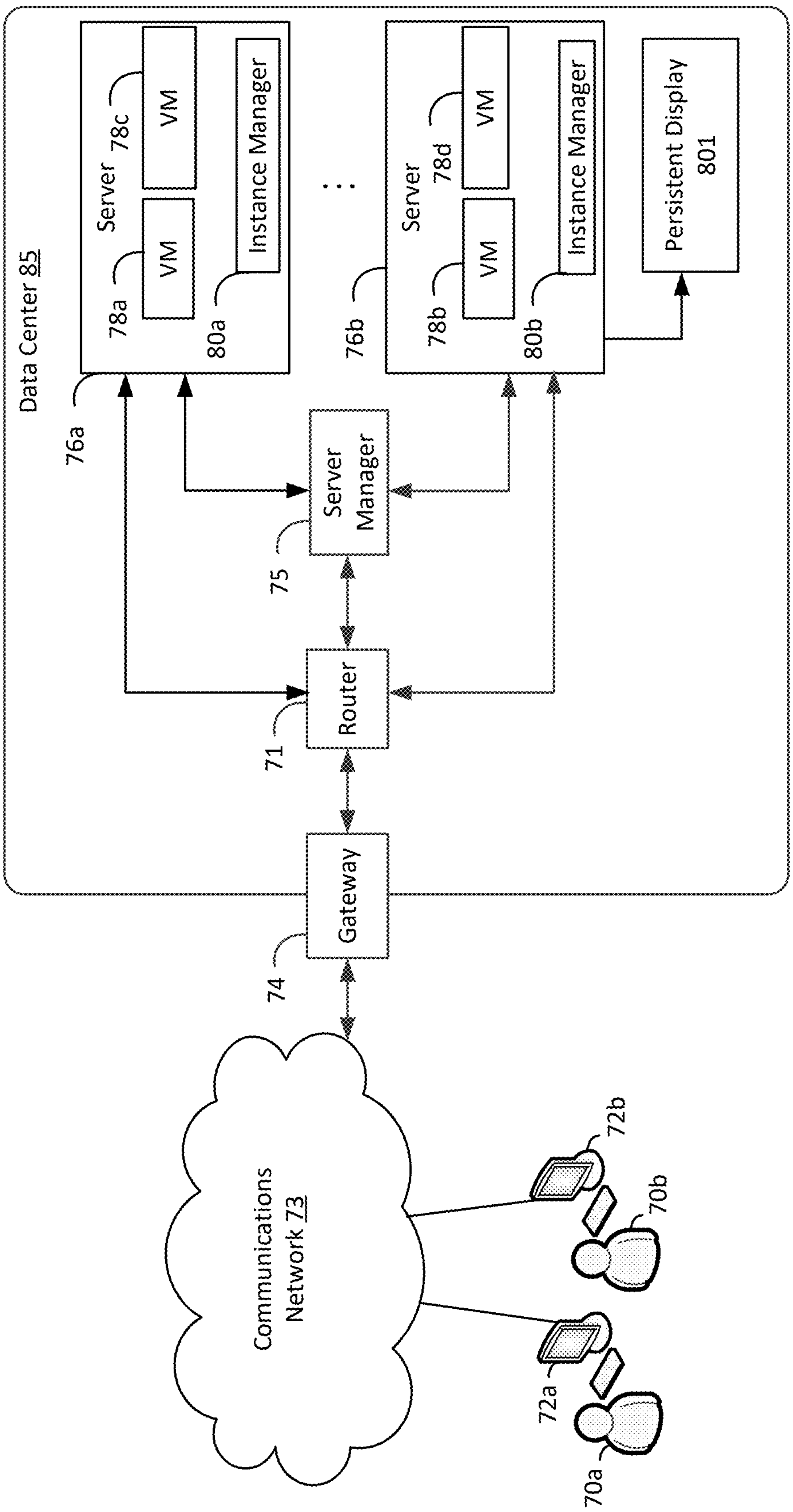
FIG. 8 is a diagram illustrating an example system for transmitting and providing data that may be used in accordance with the present description.

As described above, in some examples, in addition, or as an alternative, to servers, a display may display diagnostic information for other components associated with a server rack. These other components may include, for example, one or more power supplies (e.g., included in a power supply shelf), one or more batteries (e.g., included in a battery shelf), data switches, and other components associated with a server rack. Thus, in some examples, any references to a server in FIG. 7 may be modified to refer instead to one or more components associated with a server rack. Accordingly, for example, operation 710 may include receiving diagnostic data corresponding to one or more components associated with a server rack. The one or more components associated with the server rack may include, for example, one or more servers, one or more power supplies, one or more batteries, one or more data switches and/or other components associated with the server rack. Similarly, any references in FIG. 7 to server diagnostic data and server diagnostic information may be modified to refer instead to diagnostic data and diagnostic information, which may include diagnostic information/data corresponding to any components associated with a server rack (e.g., including servers, power supplies, batteries and/or data switches). An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity- and small resources-consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78). In this example, a persistent display 801 is connected to server 76*b*. The persistent display 801 may display server diagnostic information for server 76*b* according to any, or all, of the techniques described above with reference to FIGS. 1-7.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76*a* and 76*b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
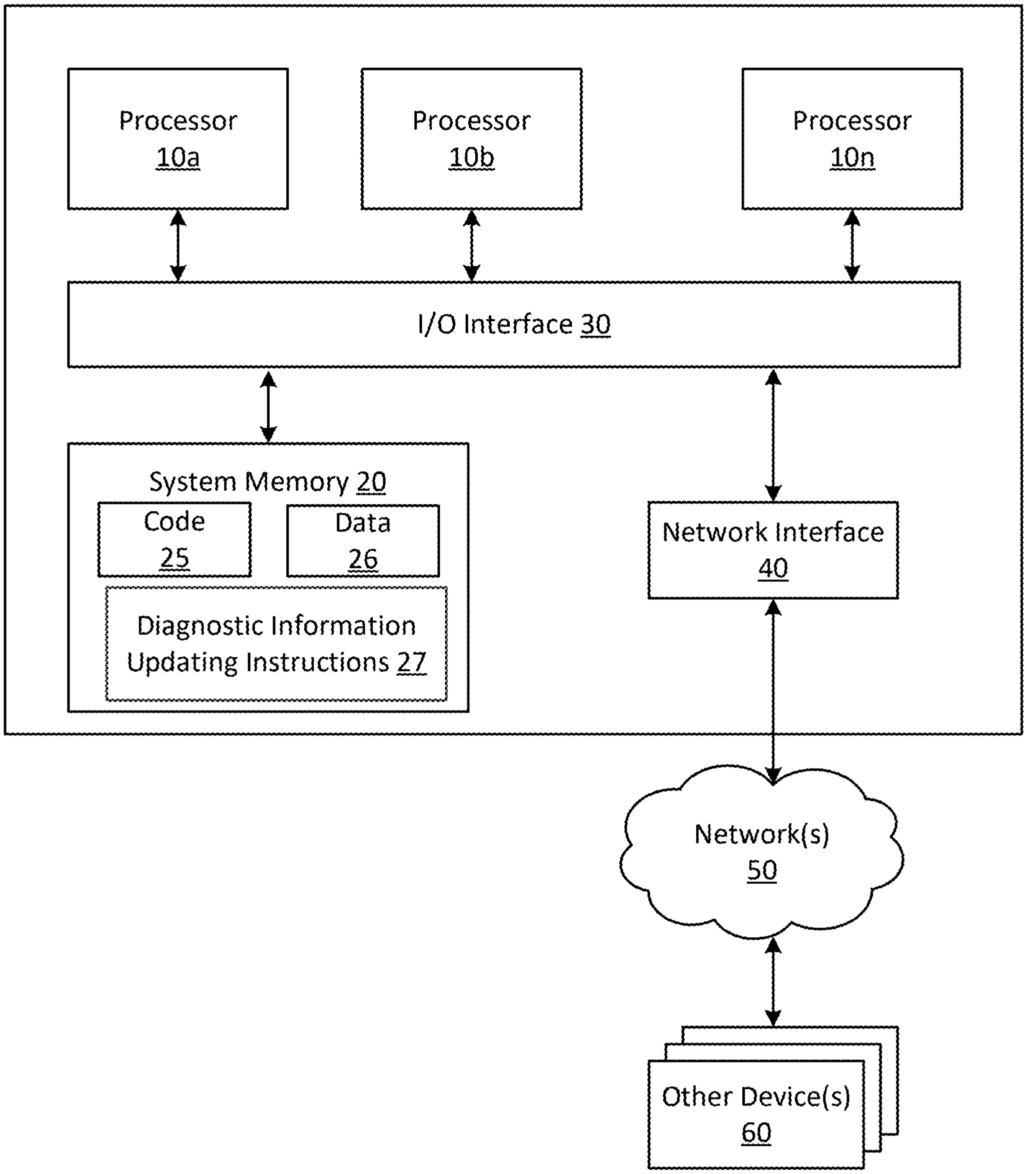
FIG. 9 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes diagnostic information updating instructions 27, which are instructions for executing any, or all, of the diagnostic information updating techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:

a persistent display;

one or more processors; and one or more memories having stored therein processor-executable instructions that, upon execution by the one or more processors, cause the system to perform operations comprising:

receiving first server diagnostic data associated with a server, wherein the first server diagnostic data has a first priority of a plurality of priorities of a diagnostic data prioritization hierarchy;

determining, based at least in part on the first priority of the first server diagnostic data, to perform a diagnostic information update on the persistent display; and generating, based at least in part on the first server diagnostic data, first rendering information that causes first server diagnostic information to be displayed on the persistent display, wherein the first server diagnostic information is representative of the first server diagnostic data, and wherein displaying the first server diagnostic information comprises overwriting currently displayed server diagnostic information when the first server diagnostic data has a higher priority than server diagnostic data represented by the currently displayed server diagnostic information, wherein the persistent display is configured to initiate displaying of the first server diagnostic information while the persistent display is powered, and to persistently display the first server diagnostic information while unpowered.

2. The system of claim 1, wherein the persistent display is connected to a power source via the server, and wherein the persistent display loses power when the server is disconnected from the power source.

3. The system of claim 1, wherein the determining, based at least in part on the first priority of the first server diagnostic data, to perform the diagnostic information update on the persistent display comprises:

determining that the first priority of the first server diagnostic data is higher in the diagnostic data prioritization hierarchy than a second priority of other server diagnostic data represented by the other server diagnostic information; and performing the diagnostic information update based at least in part on the first priority being higher in the diagnostic data prioritization hierarchy than the second priority.

4. The system of claim 1, wherein the generating, based at least in part on the first server diagnostic data, the first rendering information comprises:

generating a scannable asset that is included in the first rendering information.

5. A method comprising:

receiving first server diagnostic data associated with a server, wherein the first server diagnostic data has a first priority of a plurality of priorities of a diagnostic data prioritization hierarchy;

determining, based at least in part on the first priority of the first server diagnostic data, to perform a diagnostic information update on a persistent display, wherein the determining comprises determining that the first priority of the first server diagnostic data is higher than a second priority of other server diagnostic data represented by other server diagnostic information displayed by the persistent display prior to the diagnostic information update;

generating, based at least in part on the first server diagnostic data, first rendering information that causes first server diagnostic information to be displayed on a persistent display, wherein the first server diagnostic information is representative of the first server diagnostic data, and wherein displaying the first server diagnostic information comprises overwriting currently displayed server diagnostic information when the first server diagnostic data has a higher priority than server diagnostic data represented by the currently displayed server diagnostic information; and displaying, by the persistent display, using the first rendering information, the first server diagnostic information, wherein the persistent display is configured to initiate the displaying of the first server diagnostic information while the persistent display is powered and to persistently display the first server diagnostic information while unpowered.

6. The method of claim 5, wherein the persistent display is connected to a power source via the server, and wherein the persistent display loses power when the server is disconnected from the power source.

7. The method of claim 5, wherein the generating, based at least in part on the first server diagnostic data, the first rendering information comprises:

generating a scannable asset that is included in the first rendering information.

8. The method of claim 7, wherein the scannable asset is a bar code.

9. The method of claim 8, wherein the persistent display is included in a panel that is extendible from the server for viewing and that is retractable into the server for storage.

10. The method of claim 5, wherein the persistent display is attachable to, and detachable from, the server.

11. The method of claim 5, wherein the first server diagnostic information comprises at least one of text or graphics representative of the first server diagnostic data.

12. One or more non-transitory computer-readable storage media having stored thereon computing instructions that, upon execution by one or more computing devices, cause the one or more computing devices to perform operations comprising:

receiving first server diagnostic data associated with a server, wherein the first server diagnostic data has a first priority of a plurality of priorities of a diagnostic data prioritization hierarchy;

determining, based at least in part on the first priority of the first server diagnostic data, to perform a diagnostic information update on a persistent display, wherein the determining comprises determining that the first priority of the first server diagnostic data is higher than a second priority of other server diagnostic data represented by other server diagnostic information displayed by the persistent display prior to the diagnostic information update;

generating, based at least in part on the first server diagnostic data, first rendering information that causes first server diagnostic information to be displayed on a persistent display, wherein the first server diagnostic information is representative of the first server diagnostic data, and wherein displaying the first server diagnostic information comprises overwriting currently displayed server diagnostic information when the first server diagnostic data has a higher priority than server diagnostic data represented by the currently displayed server diagnostic information; and displaying, by the persistent display, using the first rendering information, the first server diagnostic information, wherein the persistent display is configured to initiate the displaying of the first server diagnostic information while the persistent display is powered and to persistently display the first server diagnostic information while unpowered.

13. The one or more non-transitory computer-readable storage media of claim 12, wherein the persistent display is connected to a power source via the server, and wherein the persistent display loses power when the server is disconnected from the power source.

14. The one or more non-transitory computer-readable storage media of claim 12, wherein the generating, based at least in part on the first server diagnostic data, the first rendering information comprises:

generating a scannable asset that is included in the first rendering information.

* * * * *